(12) United States Patent
Jan

(10) Patent No.: US 8,683,891 B2
(45) Date of Patent: Apr. 1, 2014

(54) METHOD FOR CONTROLLING BACK CLEARANCE OF A MOTION TRANSMISSION APPARATUS

(76) Inventor: Johnson Jan, Taichung (TW)

( * ) Notice: Subject to any disclaimer, the term of this patent is extended or adjusted under 35 U.S.C. 154(b) by 136 days.

(21) Appl. No.: 13/477,937

(22) Filed: May 22, 2012

(65) Prior Publication Data

US 2013/0312553 A1    Nov. 28, 2013

(51) Int. Cl.
*F16H 37/06*    (2006.01)
(52) U.S. Cl.
USPC ........................................ 74/665 C
(58) Field of Classification Search
USPC .............................. 74/440, 458, 665 A, 665 C
See application file for complete search history.

(56) References Cited

U.S. PATENT DOCUMENTS

| 3,213,711 A | * | 10/1965 | Van Den Kieboom | ............ 475/7 |
| 3,788,165 A | * | 1/1974 | Klotsvog | ............................ 475/2 |
| 4,484,871 A | * | 11/1984 | Adman et al. | ................... 418/69 |

* cited by examiner

*Primary Examiner* — Ha D Ho

(57) ABSTRACT

A method for controlling back clearance of a motion transmission apparatus, is capable of controlling the generation, reduction and even elimination of a back clearance of a motion transmission apparatus to meet different needs. The motion transmission apparatus comprises: a first electric motor, a second electric motor, and a toothed member engaged with the first and second toothed drive members, when the toothed member needs to be precisely positioned, the back clearance between the second electric motor and the toothed member at different positions of the toothed member will be controlled according to the torque change, so as to consequently change a position offset of the second electric motor with respect to the first electric motor, when the toothed member doesn't need to be precisely positioned, the second electric motor shouldn't be controlled.

2 Claims, 4 Drawing Sheets

METHOD FOR CONTROLLING BACK CLEARANCE OF A MOTION TRANSMISSION APPARATUS

BACKGROUND OF THE INVENTION

1. Field of the Invention

The present invention relates to a method for controlling a motion transmission apparatus, and more particularly to a method for controlling back clearance of a motion transmission apparatus.

2. Description of the Prior Art

Many of the existing machines employ various toothed elements and electric motor to transmit motion and achieve displacement. The toothed elements includes toothed bar, worm wheel, and screw, etc.

The motion transmission is mainly achieved by the teeth-to-teeth engagement between the electric motor and the various toothed elements. However, there is always back clearance between the electric motor and the toothed elements due to the factors of manufacturing tolerance and abrasion, and the back clearance will cause collision between teeth at the time the electric motor starts, runs or stops, which consequently causes vibration, noise and even damage.

However, an appropriate amount of back clearance can reduce transmission loss, and extend the service life of the electric motor and the toothed elements.

The present invention has arisen to mitigate and/or obviate the afore-described disadvantages.

SUMMARY OF THE INVENTION

The primary object of the present invention is to provide a method for controlling back clearance of a motion transmission apparatus, which is capable of controlling the generation, reduction and even elimination of a back clearance of a motion transmission apparatus to meet different needs.

To achieve the above object, a method for controlling back clearance of a motion transmission apparatus, the motion transmission apparatus comprises: a first electric motor with a first toothed drive member, a second electric motor with a second toothed drive member, and a toothed member to be engaged with the first and second toothed drive members, the method comprises the following steps:

controlling the first electric motor and the second electric motor to rotate in opposite directions to fix the toothed element;

controlling the second electric motor to output a torque capable of driving the toothed member to move, when a back clearance appears between the toothed member and the second toothed drive member, or between the toothed member and the first toothed drive member, the torque of the second electric motor will change, and the torque change of the second electric motor at different positions with respect to the toothed member will be recorded;

when the toothed member needs to be precisely positioned, the back clearance between the second electric motor and the toothed member at different positions of the toothed member will be controlled according to the torque change, so as to consequently change a position offset of the second electric motor with respect to the first electric motor, when the toothed member doesn't need to be precisely positioned, the second electric motor shouldn't be controlled.

The first and second electric motors are preferably servo motors.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
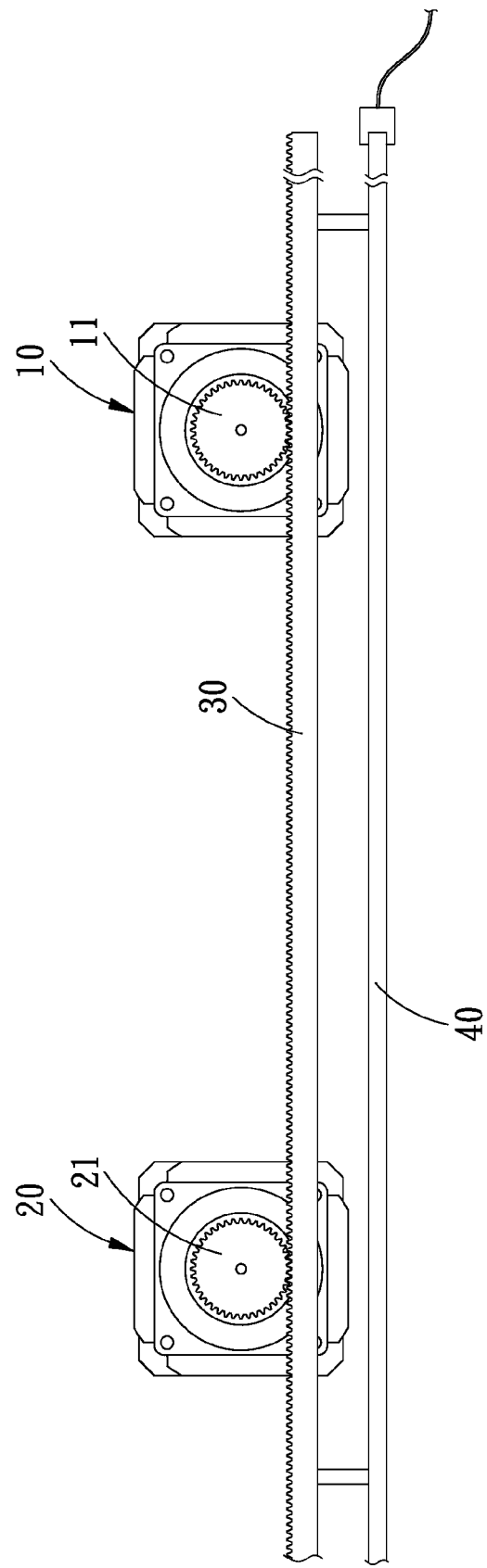
FIG. 1 is an assembly view of a device used in combination with a method for controlling back clearance of a motion transmission apparatus in accordance with a first embodiment of the present invention.
Figure 2:
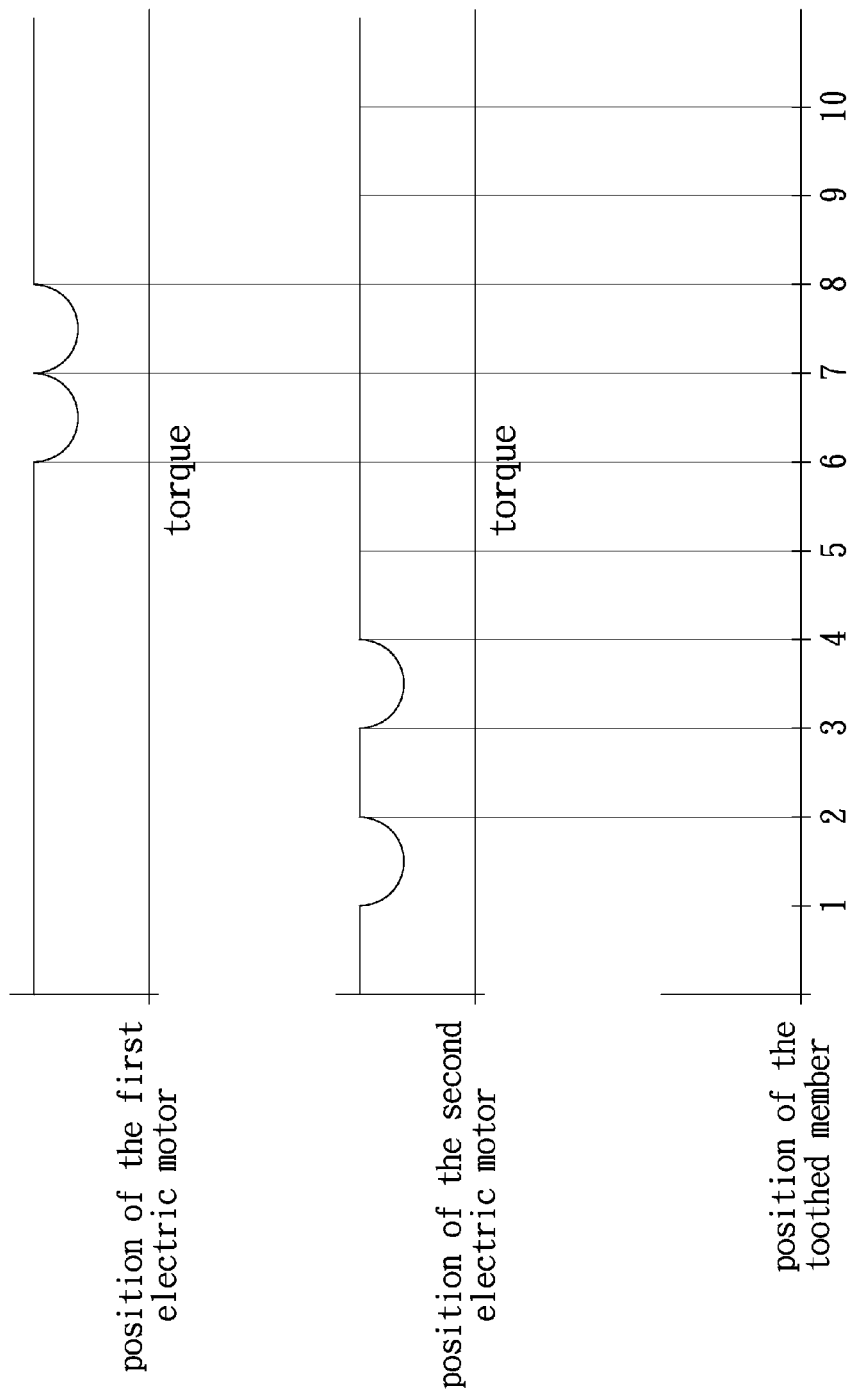
FIG. 2 shows the torque of the first and second electric motors at different positions of the toothed member in accordance with a first embodiment of the present invention.

Referring to FIGS. 1 and 2, the present invention is aimed at providing a method for controlling back clearance of a motion transmission apparatus, wherein the motion transmission apparatus comprises: a first electric motor 10 with a first toothed drive member 11, a second electric motor 20 with a second toothed drive member 21, and a toothed member 30 to be engaged with the first and second toothed drive members 11, 21. The first and second electric motors 10, 20 are servo motors, and the operation and structure of the servo motors are conventional, so no further description is necessary. The first and second toothed drive members 11, 21 are toothed wheels. The toothed member 30 can be toothed bar, worm wheel, screw, and etc. In this embodiment, the toothed member 30 is a tooted bar used in combination with an optical scale 40 which is used to measure the displacement of the toothed member 30. The method for controlling back clearance of the motion transmission apparatus comprises the following steps:

a. controlling the first electric motor 10 and the second electric motor 20 to rotate in opposite directions (for example, the first electric motor 10 rotates clockwise, and the second electric motor 20 rotates counterclockwise, or the other way round) to fix the toothed element 30, at this moment, the first electric motor 10 serves to fix the toothed member 30.

b. controlling the second electric motor 20 to output a torque capable of driving the toothed member 30 to move, namely, controlling the first and second electric motors 10, 20 to rotate idly with respect to the toothed member 30. When back clearance appears between the toothed member 30 and the second toothed drive member 21, or between the toothed member 30 and the first toothed drive member 11, the torque of the second electric motor 20 will change, and the torque changes of the second electric motor 20 in different positions with respect to the toothed member 30 will be recorded. As shown in FIG. 2, there are 1-10 positions on the toothed member 30, when the second electric motor 20 is located at the positions 1 and 3 of the toothed member 30, there will be a back clearance between the second electric motor 20 and the toothed member 30. When the first electric motor 10 is located at the positions 8, 7 of the toothed member 30, a back clearance will appear between the first electric motor 10 and the toothed member 30. At this moment, the torque of the second electric motor 20 will change when the first electric motor 10 is located at the positions 7 and 8.

c. when the toothed member 30 needs to be precisely positioned, the back clearance between the second electric motor 20 and the toothed member 30 at different positions of the toothed member 30 can be controlled according to the torque change, so as to consequently change the position offset of the second electric motor 20 with respect to the first electric motor 10. For example, when the first electric motor 10 drives the toothed member 30 to move, and makes the second electric motor 20 move to the position 1 of the toothed member 30, the position offset of the second electric motor 20 will be increased so as to eliminate the back clearance generated at the position 1 of the toothed member 30 by the second electric motor 20, and thus the toothed member 30 can be precisely positioned.

When the toothed member 30 doesn't need to be precisely positioned, the second electric motor 20 shouldn't be controlled, so that, when the first electric motor 10 drives the toothed member 30 to move, an appropriate amount of back clearance will be generated to meet some special (transmission) needs, so as to reduce the abrasion between the first and second electric motors 10, 20 and the toothed member 30.

Therefore, besides reducing and eliminating the back clearance of a motion transmission apparatus, the present invention is also capable of allowing the back clearance to exist to meet some special needs.

Figure 3:
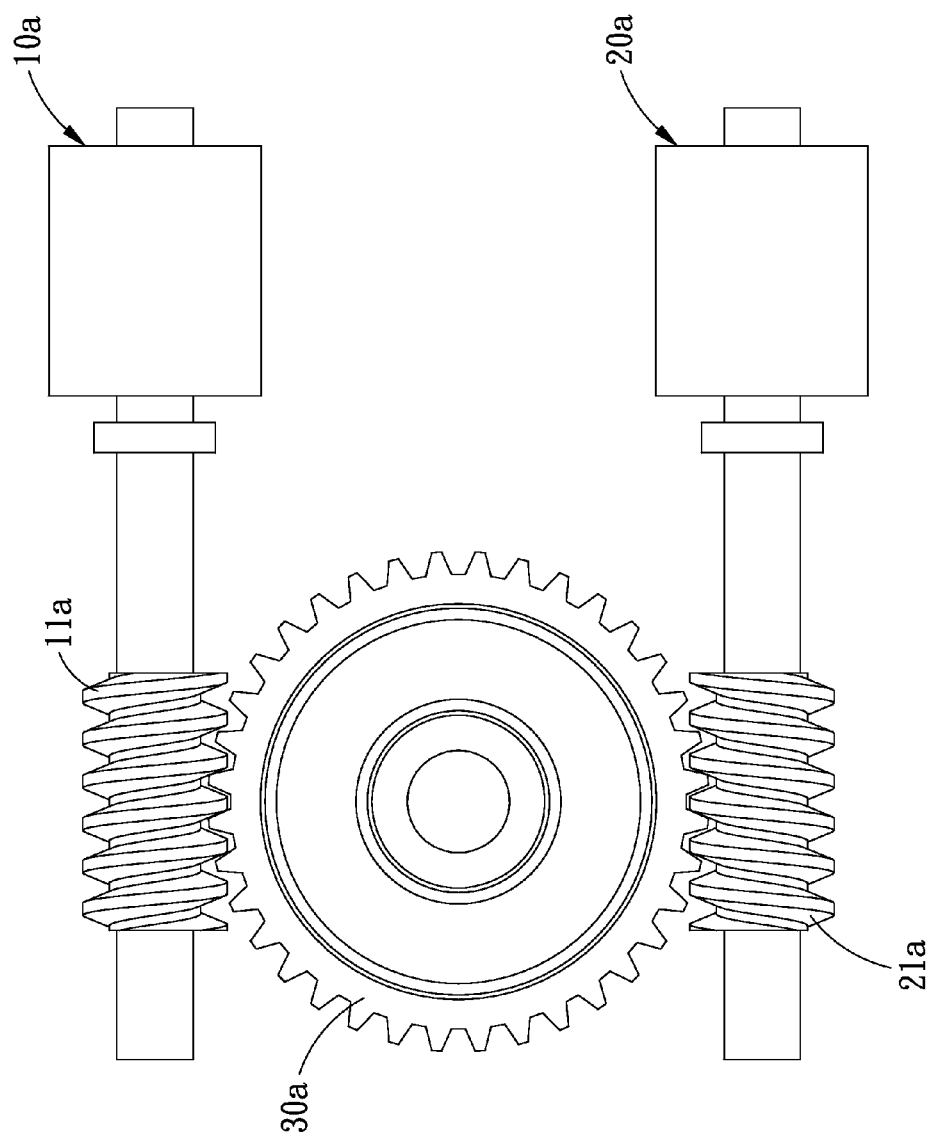
FIG. 3 is an assembly view of the device used in combination with a method for controlling back clearance of a motion transmission apparatus in accordance with a second embodiment of the present invention.

Referring to FIG. 3, a second embodiment of the present invention is shown and similar to the previous embodiment, except that: the first and second toothed drive members 11a, 21a driven by the first and second electric motors 10a, 20a are worm shafts, and the toothed member 30a is a worm wheel.

Figure 4:
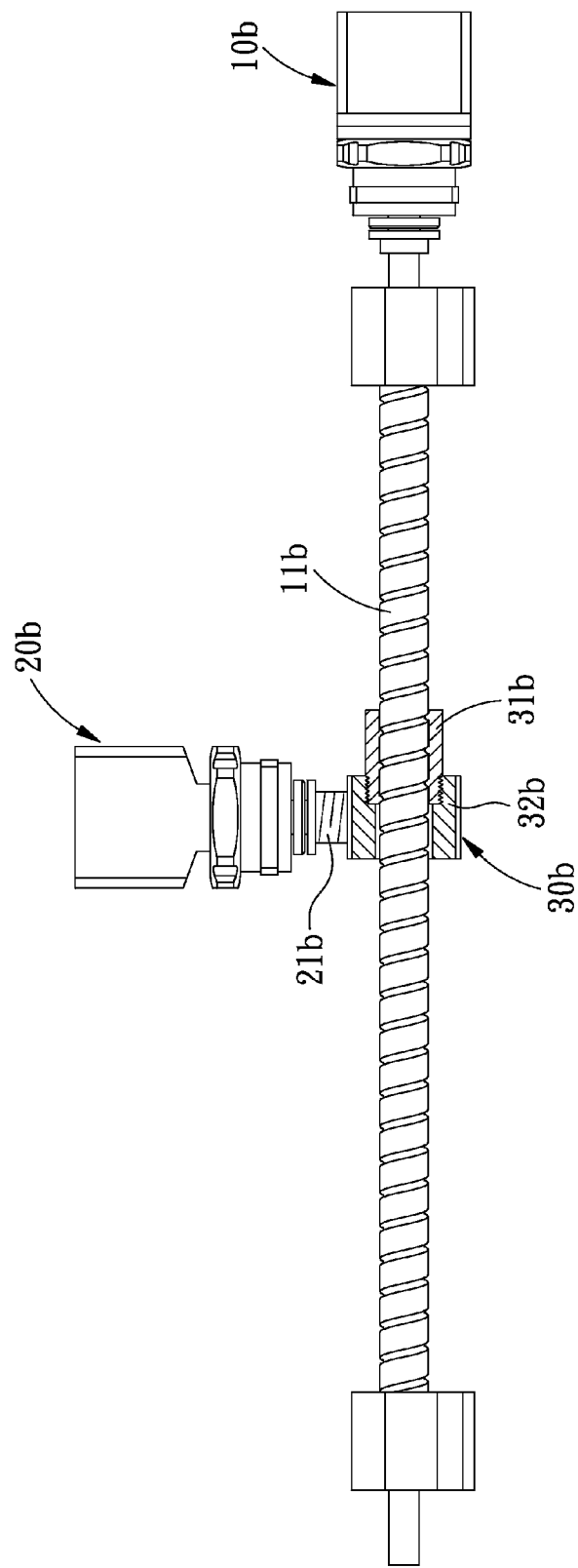
FIG. 4 is an assembly view of a device used in combination with a method for controlling back clearance of a motion transmission apparatus in accordance with a third embodiment of the present invention.

As shown in FIG. 4, a third embodiment of the present invention is similar to the first embodiment, except that: the first toothed drive member 11b driven by the first electric motor 10b is a screw, the second toothed drive member 21b driven by the second electric motor 20b is a worm wheel, and the toothed member 30b is a slide block which comprises a first nut 31b and a second nut 32b. The first nut 31b is screwed on the first toothed drive member 11b. The second toothed drive member 21b driven by the second electric motor 20b drives the second nut 32b to rotate clockwise or counterclockwise to tighten the second nut 32b to a predetermined extent.

While we have shown and described various embodiments in accordance with the present invention, it is clear to those skilled in the art that further embodiments may be made without departing from the scope of the present invention.

What is claimed is:

1. A method for controlling back clearance of a motion transmission apparatus, the motion transmission apparatus comprising: a first electric motor with a first toothed drive member, a second electric motor with a second toothed drive member, and a toothed member to be engaged with the first and second toothed drive members, the method comprising the following steps:

controlling the first electric motor and the second electric motor to rotate in opposite directions to fix the toothed member;

controlling the second electric motor to output a torque capable of driving the toothed member to move, when a back clearance appears between the toothed member and the second toothed drive member, or between the toothed member and the first toothed drive member, the torque of the second electric motor will change, and the torque change of the second electric motor at different positions with respect to the toothed member will be recorded;

when the toothed member needs to be precisely positioned, the back clearance between the second toothed drive member of the second electric motor and the toothed member at different positions of the toothed member will be controlled according to the torque change, so as to consequently change a position offset of the second electric motor with respect to the first electric motor, when the toothed member doesn't need to be precisely positioned, the second electric motor shouldn't be controlled.

2. The method for controlling back clearance of a motion transmission apparatus as claimed in claim 1, wherein the first and second electric motors are servo motors.

\* \* \* \* \*